United States Patent [19]

Fink et al.

[11] 4,326,999

[45] Apr. 27, 1982

[54] LUBRICANT AND RELEASE AGENT FOR MOLDED RUBBER ARTICLES

[75] Inventors: Hans-Ferdi Fink, Essen; Rolf Freiberger, Schermbeck-Damm, both of Fed. Rep. of Germany

[73] Assignee: Th. Goldschmidt AG, Essen, Fed. Rep. of Germany

[21] Appl. No.: 78,767

[22] Filed: Sep. 25, 1979

[30] Foreign Application Priority Data

Oct. 16, 1978 [GB] United Kingdom ............... 40688/78

[51] Int. Cl.$^3$ ........................ L08L 91/00; G08L 83/04
[52] U.S. Cl. .................................. 524/261; 106/38.22; 106/38.24; 524/78; 524/311; 524/313; 524/317; 524/700; 524/762; 524/778
[58] Field of Search ............... 260/29.1 SB, 18 S, 31.6, 260/31.8 S, 33.2 SB; 525/101

[56] References Cited

U.S. PATENT DOCUMENTS

| | | | |
|---|---|---|---|
| 2,680,723 | 6/1954 | Kronstein | 260/18 S |
| 3,308,079 | 3/1967 | Haenni | 260/29.1 |
| 3,684,756 | 8/1972 | Brooks | 260/18 S |
| 3,756,972 | 9/1973 | Kobayashi et al. | 260/18 S |
| 3,959,203 | 5/1976 | Keil | 260/29.1 SB |
| 4,032,494 | 6/1977 | Gentry | 525/101 |
| 4,120,837 | 10/1978 | Schäfer et al. | 260/29.1 SB |

FOREIGN PATENT DOCUMENTS

| | | | |
|---|---|---|---|
| 610743 | 12/1960 | Canada | 260/18 S |
| 6706538 | 11/1967 | Netherlands | 260/29.1 |

*Primary Examiner*—Joseph L. Schofer
*Assistant Examiner*—Peter F. Kulkosky
*Attorney, Agent, or Firm*—Toren, McGeady & Stanger

[57] ABSTRACT

A composition which possesses both good lubrication and release properties for use in the manufacture of molded rubber articles which comprises a mixture of a hardenable silicone resin and an oil, the oil having the property of not dissolving or swelling rubber, the weight ratio of resin to oil being from 5:1 to 1:20.

8 Claims, No Drawings

LUBRICANT AND RELEASE AGENT FOR MOLDED RUBBER ARTICLES

BACKGROUND OF THE INVENTION

1. Field of the Invention

This invention relates to the field of release agents for molded rubber articles and particularly to the use of silicone oils therefor.

2. Description of the Prior Art

Molded rubber articles generally are produced by compression molding, casting or extruding of vulcanizable intermediates. After the molded articles are vulcanized, it must be possible to easily remove them for the mold. For this purpose, silicone oils of average viscosity or emulsions containing such silicone oils are frequently used.

If the rubber material to be vulcanized is extruded in the customary manner, for example, in the manufacture of so-called long hoses which are extruded over plugs, such a release agent must have lubricating as well as release properties. The rubber material must not adhere to the plug nor may there be excessive friction as it slides over the plug.

Silicone oils or emulsions of silicone oils are not able to act as release agents and, at the same time, provide the necessary lubricating properties. In actual practice, dispersions of polytetrafluoroethylene (Teflon) in solvents have proven to be useful. The uniform and reproducible application of these dispersions on the surfaces which give shape to the articles does, however, create difficulties. In addition, the use of such dispersions is limited because of their high cost.

SUMMARY OF THE INVENTION

We have discovered a material which exhibits lubricating and release properties toward the rubber materials on the form-giving surfaces. At the same time, it is possible to apply the lubricant and release agent of the present invention as an extremely thin layer on the deforming surface of the component or mold.

The composition of the present invention also is effective over a long period and does not decompose under conditions of processing and does not have a harmful effect on the end use properties of the rubber or the molded rubber articles obtained after vulcanization.

Particularly, we have discovered that these properties are exhibited by a mixture of a hardenable silicon resin with an oil which does not dissolve or swell rubber, in a weight ratio of 5:1 to 1:20.

DESCRIPTION OF THE PREFERRED EMBODIMENT

As used herein, the term silicone resin means a resin which contains atoms and which can be set on the form-giving surface at a temperature of 120° to 180° C. during a period of at most 10 to 30 minutes. For this purpose, pure silicone resins as well as silicone resins modified with organic blocks may be used.

As pure silicone resins, especially the methyl silicone resins as well as resins in which a portion of the methyl groups is replaced by phenyl groups, are suitable. Especially suitable are methyl-phenyl silicone resins, in which the ratio of methyl:phenyl groups is 1:1.

Organically modified silicone resins suitable in the present invention are those prepared by the reaction of reactive silicon resin intermediates with polyester resins. Such resins are described, for example, in German Auslegeschrift 22 32 419. As described herein, alkyl or aryl substituted polysiloxane, which carry SiO-alkyl groups, are reacted with hydroxyl group containing polyesters with the formation of block mixed condensates. Also useful are organically modified silicone resins which contain as organic links, compounds of the formula

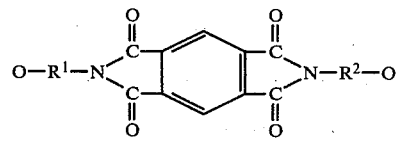

in which $R^1$ and $R^2$ represent alkylene residues with 2 to 4 carbon atoms.

The invention, however, is not limited to the use of the aforementioned organically modified silicone resins. In principle, all silicone resins which set to a hard and smooth film in the given temperature range may be used.

Suitable oils for use in the mixture of the present invention include silicone oils with a viscosity of 100 to 10,000 mPa. seconds. In general, silicone oils contain a methyl group as the organic substituent linked to the silicone atom. However, other oils, which are known to improve the antifriction properties by reducing friction, may also be used. An example of such an oil is neat's foot oil. Other suitable oils are pentaerythritol tetrapelargonate, trimethylolpropane tripelargonate, soybean oil, and rape oil.

Addition products of ethylene oxide, propylene oxide or mixtures of the two with alcohols, especially those with 1 to 6 carbon atoms, may also be used, as may the corresponding addition products of multifunctional alcohols, such as, glycol, glycerin, and TMP (trimethylol propane). The extent of addition of the alkylene oxides is limited only by the requirement that the addition products must have an oily consistency. Such addition products have molecular weights of 1,000 to 10,000.

The suitability of oily substances which do not dissolve or swell rubber is further limited by the requirement that these oily substances be water resistant. This means that they must not be removed by water, which is used for extruding the plug. Water-soluble, oily substances therefore, are not suitable.

In use, the inventively used resin and oil are preferably dissolved in a common solvent. For this purpose, low-boiling, chlorinated hydrocarbons, such as, for example, 1,1,1-trichloroethylene, methylene chloride or trichloroethylene are preferable. Mixtures of such solvents may also be used.

The solutions advisably contain 3 to 10 weight percent of the active material. The solution is sprayed on the deforming surfaces, e.g., the plug of an extrusion machine in the case of the manufacture of hoses. When the solvent has evaporated, the resin is hardened at elevated temperatures. In the course of the hardening, there is some separation of the oil and the silicone resin, so that a thin oil film is formed on the surface.

The following example illustrates the present invention:

EXAMPLE

Lubricants and release agents are prepared by dissolving hardenable silicone resins and oils which do not dissolve or swell rubber, in a solvent mixture consisting of equal parts of 1,1,1-trichloroethane and dichloromethane. The following basic formulation was used:

x weight percent of the solution of hardenable silicon resin;

y weight percent of oil, which does not dissolve or swell rubber;

100-x-y/2 weight percent of 1,1,1-trichloroethane; and 100-x-y/2 weight percent of dichloromethane.

Materials used as the hardenable silicone resins are:

(a) a 60% solution of a silicone modified polyester resin in xylene/cyclohexanone, which was prepared according to the method described in Example 19 of German Auslegeschrift No. 22 32 419;

(b) a 50% solution of a methyl silicone resin in toluene/butanol with a viscosity of 60 mm$^2$/sec. at 293° K., a $CH_3$ group to silicon ratio of 1.15 and a hydroxyl group content of 0.8 weight percent, based on the solvent-free silicone resin; and (c) a 50% solution of a methyl phenyl silicone resin in toluene/cyclohexanone with a viscosity of 160 mm$^2$/sec at 293° K. and an organo group to silicon ratio of 1.20, in which 20% of the organo groups are phenyl and 80% methyl groups. In addition, the resin contains 0.6 weight percent of hydroxyl groups.

As the oil which does not dissolve or swell rubber, the following are used:

(a) dimethylpolysiloxanes with viscosities of 1,000 mm$^2$/sec and 100 mm$^2$/sec at 293° K., referred to in the following table as silicone oils;

(b) a polyoxyethylene-polyoxypropylene monobutyl ether with a molecular weight of 1,770 and a polyoxypropylene content of 59.0 weight percent, referred to in the following table as a polyether;

(c) a commercial colza oil with the following properties:
saponification No. 170 mg KOH/g
iodine No. 98; and (d) a commercial soybean oil with the following properties:
saponification No. 193 mg KOH/g
iodine No. 124.

The ratios of mixing of the hardenable silicone resins and oils as well as the release forces exhibited by the mixture are as set forth in the table.

In order to measure the release forces, the solvent-containing mixtures of hardenable silicone resin and oil are applied to a stainless steel plug with a diameter of 30 mm and a length of 150 mm, so that about 0.1 g of the release agent combination is distributed uniformly over 100 cm$^2$ of surface area of the plug. The plug is then enveloped by a 10 cm wide, 6 mm thick band of a rubber mixture, which has not been vulcanized and which fully encloses the circumference of the plug. In order to insure satisfactory molding, two half shells of stainless steel are now placed around the rubber band connected tightly with one another. The half shells are so constructed that in the following vulcanization which is associated with an expansion, no rubber can emerge from the sealing and embedding joints between the mold and plug. The device, so charged, is then transferred to a vulcanizing kettle in which the rubber mixture is vulcanized at the appropriate temperature and for the appropriate time to effect vulcanization.

In this example, an acrylonitrile/butadiene rubber mixture was used with a tensile strength (DIN No. 53 504) of 9.0 N per mm$^2$ and a Shore hardness (DIN No. 53 505) of 50 shore A. The vulcanizing time was 20 minutes at 423° K. (150° C.). When the vulcanization was completed, the device was removed from the vulcanizing kettle and cooled to 323° K. (50° C.). Subsequently, the tangential force required to displace the molded article relative to the plug is measured. The initial force required to initiate the displacement is measured and referred to in the table as the release value. Additionally, the force required to continue the displacement is measured and referred to in the table as the sliding value. A good release agent should have a low release value and an even lower sliding value. In practice, especially for the manufacture of so-called long hoses, release agents with a release value of <10 and a sliding value of <3 have proven to be trouble-free in use.

The table shows that formulations 1 to 8 which are not in accordance with the invention, do not have adequate release and sliding values. Admittedly, the pure methyl silicone resin and also the pure silicone oils have good release values; however, the lubricating action as expressed by the sliding values, is not adequate. In contrast, the inventive mixtures (formulations 9 to 18) have good release values as well as good sliding values.

TABLE

| Release Agent and Lubricant No. | Hardenable Silicone Resin | | Oil Components | | Release Forces | |
|---|---|---|---|---|---|---|
| | Parts by Weight | Silicone Resin Type | Parts by Weight | Oil Type | Release Value | Sliding Value |
| 1 | 8.0 | silicone polyester 60% | | | 11.0 | 7.4 |
| 2 | 10.0 | methylsilicone resin 50% | | | 8.5 | 6.3 |
| 3 | 10.0 | methylphenylsilicone resin 50% | | | 14.2 | 7.0 |
| 4 | | | 5.0 | silicone oil 1000 mm$^2$s$^{-1}$ | 7.8 | 5.5 |
| 5 | | | 5.0 | silicone oil 100 mm$^2$s$^{-1}$ | 8.9 | 4.8 |
| 6. | | | 5.0 | polyether | 18.0 | 6.3 |
| 7 | | | 5.0 | colza oil | 14.1 | 5.8 |
| 8 | | | 5.0 | soybean oil | 11.6 | 6.2 |
| 9 | 8.0 | silicone polyester 60% | 5.0 | silicone oil 1000 mm$^2$s$^{-1}$ | 8.5 | 2.5 |
| 10 | 8.0 | silicone polyester 60% | 1.0 | silicone oil 1000 mm$^2$s$^{-1}$ | 8.8 | 2.8 |
| 11 | 4.0 | silicone polyester 60% | 5.0 | silicone oil | | |

TABLE-continued

| Release Agent and Lubricant No. | Hardenable Silicone Resin | | Oil Components | | Release Forces | |
| --- | --- | --- | --- | --- | --- | --- |
| | Parts by Weight | Silicone Resin Type | Parts by Weight | Oil Type | Release Value | Sliding Value |
| 12 | 8.0 | silicone polyester 60% | 1.0 | 1000 mm$^2$s$^{-1}$ colza oil | 6.3 8.4 | 1.8 2.4 |
| 13 | 10.0 | methylsilicone resin 50% | 2.5 | silicone oil 100 mm$^2$s$^{-1}$ | 6.0 | 2.1 |
| 14 | 10.0 | methylsilicone resin 50% | 2.5 | polyether | 8.0 | 1.5 |
| 15 | 10.0 | methylphenyl silicone resin 50% | 5.0 | silicone oil 1000 mm$^2$s$^{-1}$ | 6.5 | 2.5 |
| 16 | 2.0 | methylphenyl silicone resin 50% | 5.0 | silicone oil 1000 mm$^2$s$^{-1}$ | 5.0 | 1.0 |
| 17 | 10.0 | methylphenyl silicone resin 50% | 2.0 | soybean oil | 7.9 | 2.3 |
| 18 | 5.0 | methylphenyl silicone resin 50% | 5.0 | soybean oil | 8.1 | 2.8 |

1 to 8 not in accordance with the invention
9 to 18 in accordance with the invention.

What is claimed is:

1. A composition for use as a lubricant and release agent in the manufacture of molded long rubber hoses consisting essentially of a mixture of a hardenable, modified silicone resin prepared by the condensation reaction of alkyl or aryl substituted polysiloxane having SiO-alkyl groups thereon with hydroxyl containing polyester, and an oil, the oil having the property of not dissolving or swelling rubber, the weight ratio of resin to oil being from 5:1 to 1:20.

2. The composition of claim 1 wherein the resin is a methyl silicone resin.

3. The composition of claim 1 wherein the oil is a silicone oil having a viscosity of 100 to 10,000 mPa. seconds.

4. The composition of claim 1 wherein the oil is selected from the group consisting of neat's-foot oil, pentaerythritol tetrapelargonate, trimethylolpropane, tripelargonate, soybean oil, and rape oil.

5. The composition of claim 1 wherein the oil is an addition product of ethylene oxide, propylene oxide or mixtures thereof with alcohols, the addition product having a molecular weight between 1,000 to 10,000.

6. The composition of claim 5 wherein the oil is an addition product of alcohols having 1 to 6 carbon atoms.

7. The composition of claim 5 wherein the alcohol is selected from the group consisting of glycol, glycerin and trimethylol propane.

8. In a method for manufacturing molded long rubber hoses wherein a release agent is applied to a mold, the rubber composition is applied to the mold and then subjected to vulcanization conditions, the improvement which comprises said release agent consisting essentially of a mixture of a hardenable, modified silicone resin prepared by the condensation reaction of alkyl or aryl substituted polyester having SiO-alkyl groups thereon with hydroxyl containing polyester, and an oil, the oil having the property of not dissolving or swelling rubber, the weight ratio of resin to oil being from 5:1 to 1:20.

* * * * *